J. B. OWENS.
BAFFLE FOR COMBUSTION CHAMBERS OF TUNNEL KILNS.
APPLICATION FILED MAY 28, 1918.
1,379,123.
Patented May 24, 1921.
2 SHEETS—SHEET 1.
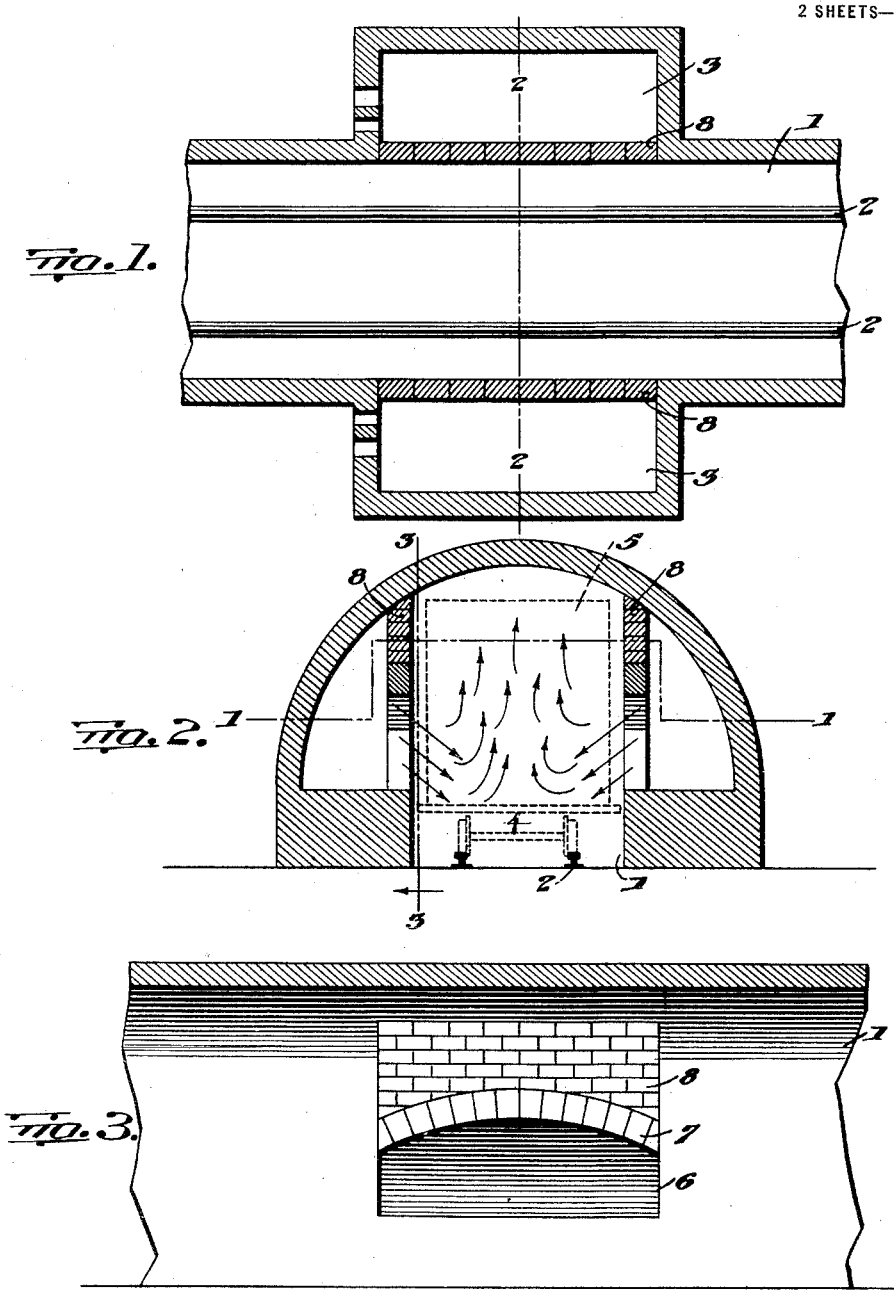

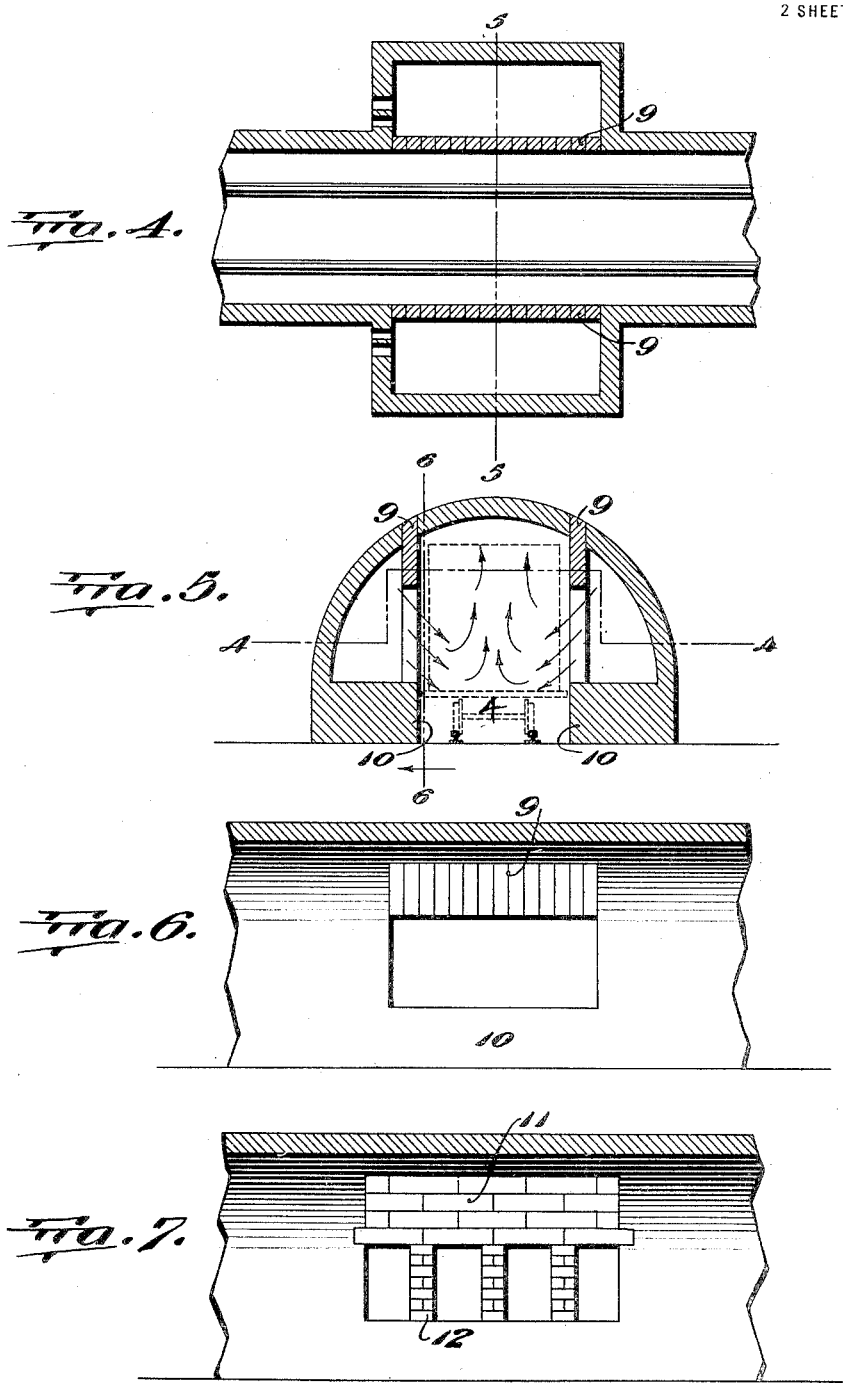

UNITED STATES PATENT OFFICE.

JOHN B. OWENS, OF METUCHEN, NEW JERSEY.

BAFFLE FOR COMBUSTION-CHAMBERS OF TUNNEL-KILNS.

1,379,123.

Specification of Letters Patent.

Patented May 24, 1921.

Application filed May 28, 1918. Serial No. 237,166.

*To all whom it may concern:*

Be it known that I, JOHN B. OWENS, a citizen of the United States, residing at Metuchen, in the county of Middlesex and State of New Jersey, have invented certain new and useful Improvements in Baffles for Combustion-Chambers of Tunnel-Kilns, of which the following is a specification.

While the present invention is particularly adapted for use in connection with tunnel kilns shown in my earlier applications and patents, and is herein described and shown in connection therewith, its use is not restricted to the Owens tunnel kiln and it may be used on other tunnel kilns.

The object of the present invention is to deflect the heat derived from the combustion of the gases in the combustion chambers of a tunnel kiln so that it will play more heavily on the lower portions of the stacks of ware on the cars than on the upper portions of said stacks and thereby so direct the heat that the draft will cause it to naturally rise and disseminate throughout the ware on the cars, thus insuring an even firing of the ware contained in all of the saggars, or, whatever containers may be used on the cars for holding the ware.

As heretofore constructed, and according to earlier methods of operation, tunnel kilns have had no means for preventing the heat derived from combustion of the gases in the combustion chambers from issuing therefrom in a more or less generally upward direction where said gases play upon the ware on the cars. Consequently, the upper portions of the stacks of ware, or, the upper saggars have usually been fired at a higher temperature than the lower portions of the stacks, resulting in variation in the ware produced. My invention overcomes this defect and insures relatively the same firing of the ware throughout the stacks carried by a car.

My baffle is located above the opening which connects the combustion chamber with the interior of the tunnel and is positioned at some point intermediate the top and bottom of the combustion chamber. According to the nature of the kiln, the baffle may be located relatively low down toward the bottom of the combustion chamber, or, on the other hand, higher up, as may be found best suited to firing the particular ware which the kiln is to handle. The baffle can be built solid or perforated. it may be a pendant wall, or it can be supported by piers. The baffle may be perforated and, if perforated, may comprise checker work. If desired, the baffle may have an arched lower face.

In the accompanying drawings:

Figure 1 is a horizontal section on the line 1—1 of Fig. 2, showing one form of the invention for carrying out my method;

Fig. 2, a vertical section on the line 2—2 of Fig. 1;

Fig. 3, a vertical section on the line 3—3 of Fig. 2;

Fig. 4, a horizontal section on the line 4—4, Fig. 5, showing another form;

Fig. 5, a vertical cross section on the line 5—5, Fig. 4;

Fig. 6, a longitudinal section on the line 6—6, Fig. 5, and

Fig. 7, a view like Fig. 6, of another form.

In the drawings I have shown a portion of the firing zone of a continuous tunnel kiln having combustion chambers on opposite sides, No. 1,251,273, Dec. 25, 1917, No. 1,278,991, Sep. 17, 1918, No. 1,289,889, Dec. 31, 1918, Nos. 1,355,906; 1,356,396; 1,356,397, October 19, 1920, as my invention is particularly adapted for use in connection with the Owens tunnel kiln. The present invention can be used, however, on any tunnel kiln.

A portion of the firing zone of the tunnel is shown at 1, the tracks at 2 and the combustion chambers at 3, the latter being on opposite sides of the tunnel. One of the cars appears at 4, it being understood that the cars fill the tunnel and run therethrough on the tracks 2 while slowly passing by continuous movement or in an alternate stop and advance movement, from the entry to the exit end of the tunnel. The stacks of ware appear in outline at 5.

Heretofore the heat from the combustion of the gases in the combustion chambers 3 has been drawn, by the usual stack or draft means, directly into the tunnel and against the ware 5, the draft causing the heat to play most intensely on the upper part of the stacks of ware 5, as the natural tendency of the heat is to rise along the arch. Consequently, the ware in the upper portions of the stacks is fired at a somewhat greater temperature than the ware in the region of the car platform and the resulting product has not been uniform. My method and baffles overcome this difficulty.

At a suitable point of the height of the opening 6 by which the combustion chamber communicates with the interior of the tunnel 1, Figs. 1, 2, 3, there is an arch 7 which is of fire-brick, and above the arch and filling the space, is a wall 8 of fire-brick, the whole constituting a baffle. The arch may be located lower down, or, higher up than as shown; the height or position of the arch may vary according to the nature of the ware which is to be fired in the kiln. The wall 8 may be solid, or, provided with perforations. If it is desired to have it perforated, it may be built as checker work.

The arch and wall constitute a baffle which causes heat from consumed gases to be deflected in the manner shown generally by the arrows in Fig. 2. In other words, the heat from the combustion chambers 3 is forced in and around the ware 5 just over the top of the car platform 4 and naturally rises and disseminates throughout the ware thereabout. The result is that the ware at the bottom of the stacks is burned at substantially the same temperature as the ware at the middle and top of each stack and a uniform firing of the ware is obtained.

Referring to another form of the invention which is shown in Figs. 4, 5, 6, the construction of the baffle comprises pendant fire-brick 9 secured to the arched roof of the kiln in line, or substantially so, with the vertical bench walls 10 of the tunnel. This construction acts in the manner heretofore described in connection with the construction of Figs. 1 to 3, to baffle the heat from the combustion of the gases within the combustion chambers and to carry out the method of firing by dissemination of the heat, first downwardly or toward the bottom of the ware and then upwardly therethrough. The length and depth of the depending wall or baffle 9 may vary within wide limits and I do not restrict myself to any particular dimensions in that respect.

In Fig. 7, I have shown a baffle wall 11, positioned and generally corresponding to the baffle 9 but supported by spaced fire-brick piers 12. This baffle acts as does the baffle 9 but the piers 12 further restrict the outflow of the heat from the combustion chamber.

What I claim is:

1. A tunnel kiln having a combustion chamber at its side, a baffle for the upper part of the combustion chamber where the latter faces the interior of the tunnel, and piers supporting said baffle, said piers being separated by discharge ports or passages through which the heat and products of combustion pass from the combustion chamber to the interior of the tunnel.

2. A tunnel kiln provided with oppositely arranged combustion chambers, a continuous arch which serves as the crown of the tunnel and also the walls of both of the combustion chambers, and perforated baffles for said combustion chambers.

3. A tunnel kiln having combustion chambers at its sides, and a continuous arch constituting the crown of the tunnel and the walls of said combustion chambers, said combustion chambers being in communication with the interior of the tunnel through a plurality of passages, ports, or openings.

4. A tunnel kiln having a combustion chamber at its side, a baffle for the upper part of the combustion chamber where the latter faces the interior of the tunnel, and piers supporting said baffle, said piers being separated by discharge ports or passages through which the heat and products of combustion pass from the combustion chamber to the interior of the tunnel, said baffle being provided with ports through which the heat and products of combustion are discharged from the combustion chamber into the tunnel.

5. A tunnel kiln provided with oppositely arranged combustion chambers, an arch which serves as the crown of the tunnel and also the walls of both of the combustion chambers, perforated baffles for said combustion chambers, and piers supporting the baffles, there being ports between the piers affording communication between the combustion chambers and the tunnel.

In testimony whereof I affix my signature.

JOHN B. OWENS.